Feb. 4, 1964 KUNIO ISHIMOTO ETAL 3,120,616

TRANSISTOR AMPLIFYING AND RECTIFYING CIRCUIT

Filed April 19, 1960

Inventors
K. ISHIMOTO
K. NAKAMURA
By C. H. Suydam
AGENT

United States Patent Office 3,120,616
Patented Feb. 4, 1964

3,120,616

TRANSISTOR AMPLIFYING AND RECTIFYING CIRCUIT

Kunio Ishimoto and Kiyoshi Nakamura, Tokyo, Japan, assignors to Nippon Electric Company Limited, Tokyo, Japan, a corporation of Japan
Filed Apr. 19, 1960, Ser. No. 23,168
Claims priority, application Japan Apr. 23, 1959
1 Claim. (Cl. 307—88.5)

This invention relates to a transistor amplifying and rectifying circuit arrangement. Specifically it relates to such a circuit with the transistor operating other than Class A, e.g., Class B, and employing negative feedback, the object being to obtain stability and high fidelity with a very simple circuit arrangement.

Another object of the invention is to provide a circuit arrangement utilizing transistors for obtaining a stabilized ratio of output A.C. signal to input A.C. signal and also a high fidelity ratio of output D.C. signal to input A.C. signal.

The above-mentioned and other features and objects of the invention and the manner of attaining them will become more apparent and the invention itself will be best understood by reference to the following description of an embodiment of the invention taken in conjunction with the accompanying drawings in which.

Figure 1:
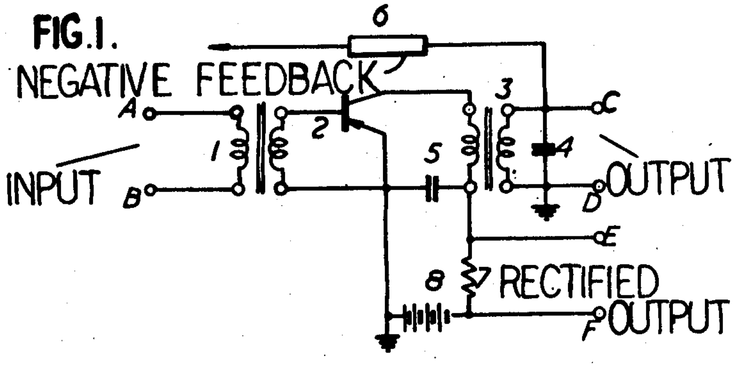
FIG. 1 is a circuit diagram showing the principle of the invention.

The main operating elements of the invention as shown in FIG. 1 are a transistor 2 operating Class B, a feedback circuit 6 to apply negative feedback to the transistor 2, and an input transformer 1 to which an alternating current input signal is applied, the latter, after being amplified and rectified, appearing across load resistor 7 which feeds biasing current to transistor 2. The alternating current signal applied to terminals A, B is amplified in its negative half cycle by the transistor 2, the amplified current flowing through the primary winding of the output transformer 3. The A.C. component is bypassed through capacitor 5, while the D.C. component passes through the load resistor 7, whereby the amplified and rectified output may be obtained from terminals E, F connected across that resistor.

If the D.C. resistance at the signal source of the transistor 2 is very low, the collector saturation current is as infinitesimal as in the case of common base configuration regardless of the configuration of transistor 2, so that the fidelity is not impaired—even though the output signal level may be very low. On the other hand, the secondary side of the output transformer 3, together with the capacitor 4, comprises a tuning circuit for the signal frequency so that the amplified input signal is obtained at the output terminals C, D, as an A.C. signal. At the same time, since part of the output is fed back negatively to the input through the feedback path 6, the ratio of output A.C. signal to input A.C. signal as well as the ratio of the output D.C. signal to input A.C. signal can be obtained with high stability and fidelity.

Figure 2:
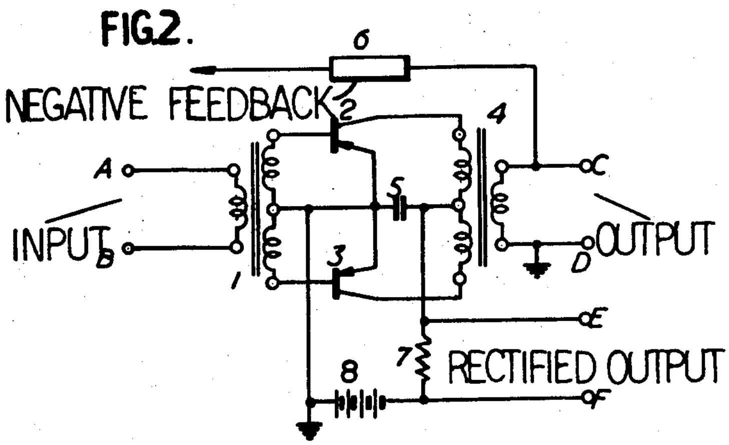
FIGS. 2 and 3 are circuit diagrams showing examples of practical applications of the invention.

The circuit shown in FIG. 1 operates at a certain frequency whereas, in the circuit of FIG. 2, transistors 2 and 3 are connected in push-pull so that a wide range of application and a more efficient full wave amplified and rectified output may be obtained.

Figure 3:
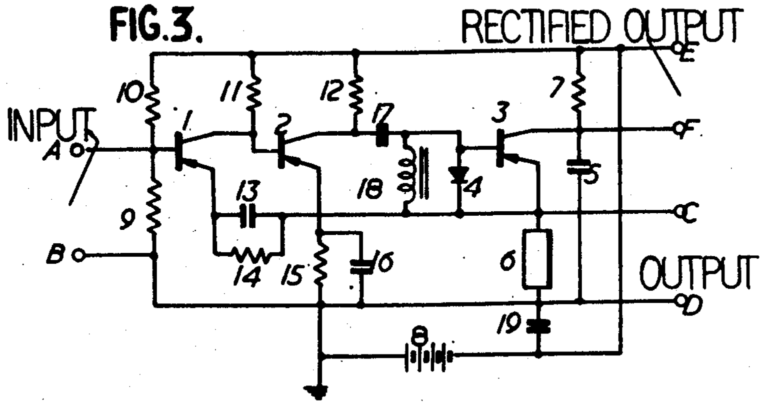

FIG. 3 shows a practical example in which the amplifier-rectifier circuit of the invention is connected directly to other amplifier stages without using a transformer.

For instance, the bias and A.C. circuit elements 8–19 are so connected that the transistors 1 and 2 may act as Class A amplifiers and transistor 3 as a Class B amplifier. The transistor 3 operates on the negative half cycle of the input wave and a part of the output voltage is fed back negatively to the emitter of transistor 1 through feedback impedance 6. On the other hand, it is possible that the transistor 3 may be cut off during the positive half cycle thereby increasing the load impedance of the transistor 2 and furthermore, may change into a non feedback operating condition and impart an exceedingly high voltage to the output circuit of transistor 2.

To avoid the above danger the diode 4 protects transistors 2 and 3 against the positive half cycle input and, at the same time, prepares a feedback path for applying negative feedback to the emitter of transistor 1 during the positive half cycle through the feedback impedance 6 as in the case of the negative half cycle. Finally, as negative feedback is applied during both positive and negative half cycles of the input, a high fidelity gain may be obtained at terminals C, D of the feedback impedance 6.

The effect of the collector saturation current of transistor 3 is made negligible by the insertion of the choke coil 18 and, even if there were a certain difference in the amount of negative feedback for the positive and negative half cycles fed back from the output of transistor 3, by the selection of the correct amount of negative feedback for each half cycle, an A.C. output having a high fidelity and a highly stabilized gain can be obtained at the output terminals C, D. Also, a D.C. output having a highly stabilized and high-fidelity gain can be obtained at terminals E and F of the feeding resistor 7 of the transistor 3.

By increasing the value of the load resistance 7, the gain of the amplified and rectified output, as disclosed in the practical examples shown in FIGS. 1, 2 and 3, may become very high. In short, this invention enables us to obtain with a simple circuit a transistor amplifying and rectifying circuit having high fidelity and stability as well as high gain at the same time. Furthermore, although the transistor has been described as operating Class B, the invention may be practiced with the transistor operating in any class other than Class A.

While we have described above the principles of this invention in connection with specific apparatus, it is to be clearly understood that this description is made only by way of example and not as a limitation to the scope of our invention as set forth in the objects thereof and in the accompanying claim.

What is claimed is:

An amplifying and rectifying circuit arrangement comprising a transistor having a base, an emitter, and a collector electrode: an input impedance for receiving an input A.C. signal, said input impedance being directly connected to said base and said emitter electrodes so as to bias said transistor for other than Class A operation, a series connection of an output impedance for deriving thereacross an amplified A.C. signal, a resistor for deriving thereacross an output D.C. signal, and a power source for supplying said transistor with operating power, said output impedance being connected at an end thereof to any one of said emitter and said collector electrodes, the series connection of said resistor and said power source being interposed between the other end of said output impedance and the remaining one of said emitter and said collector electrodes; capacitor means connected across said series connection of said resistor and said power source for by-passing said amplified A.C. signal; and means for obtaining a negative feedback voltage from across said output impedance to apply said feedback voltage prior to said input impedance; said amplified A.C. signal being linearly related to said input A.C. signal, and the amplitude of said output D.C. signal being linearly related to that of said input A.C. signal.

References Cited in the file of this patent

UNITED STATES PATENTS

| | | |
|---|---|---|
| 2,858,424 | Stern et al. | Oct. 28, 1958 |
| 2,915,600 | Starke | Dec. 1, 1959 |
| 2,997,656 | Barlow | Aug. 22, 1961 |
| 3,002,090 | Hirsch | Sept. 26, 1961 |
| 3,027,518 | Ketchledge | Mar. 27, 1962 |
| 3,030,585 | Meth | Apr. 17, 1962 |